Jan. 29, 1963  J. BÜSCHER  3,075,766
STATIONARY BODY EXERCISING APPLIANCE
Filed May 18, 1960  4 Sheets-Sheet 1

INVENTOR
JOHANN BUSCHER
By Burgess, Dinklage & Sprung
ATTORNEYS

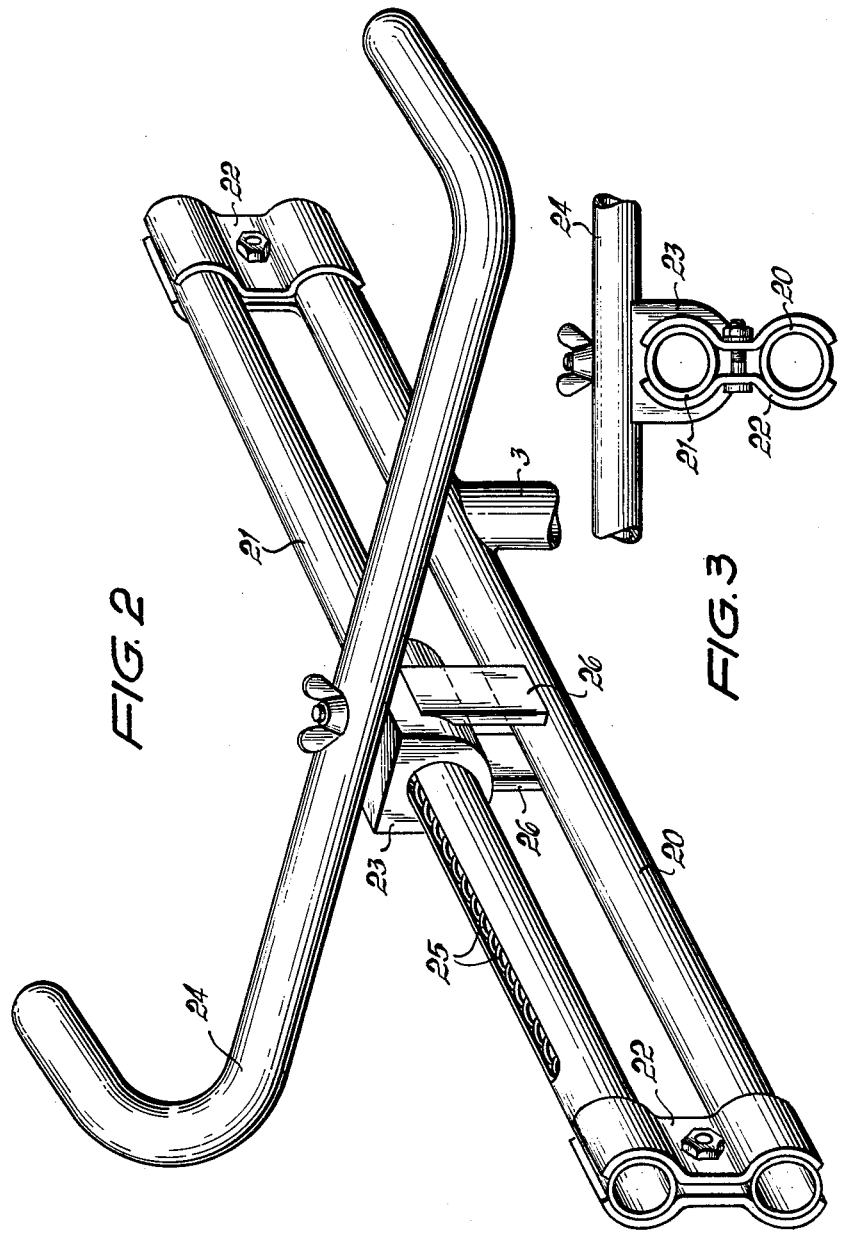

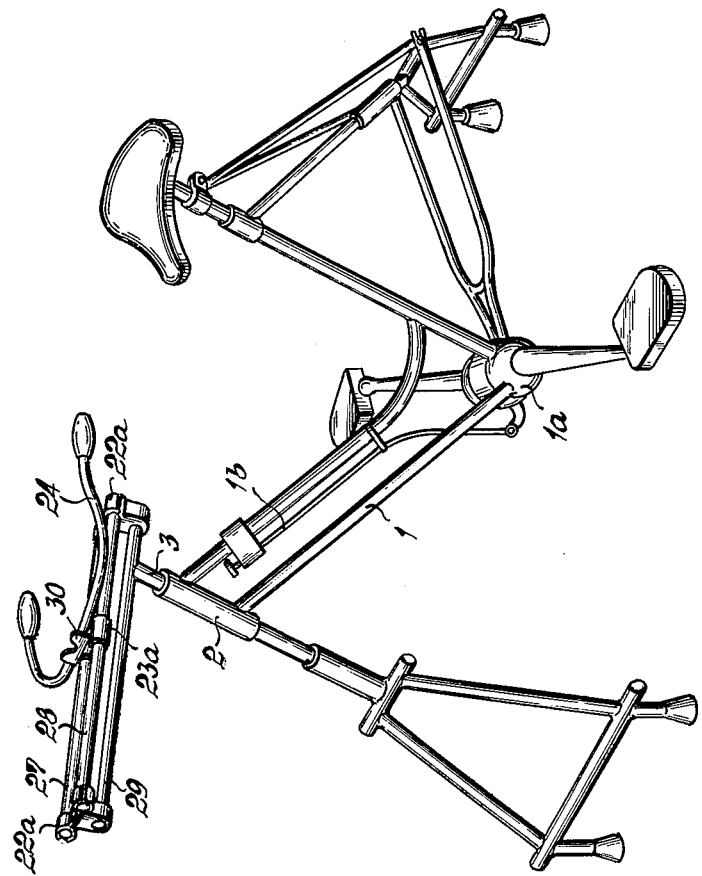

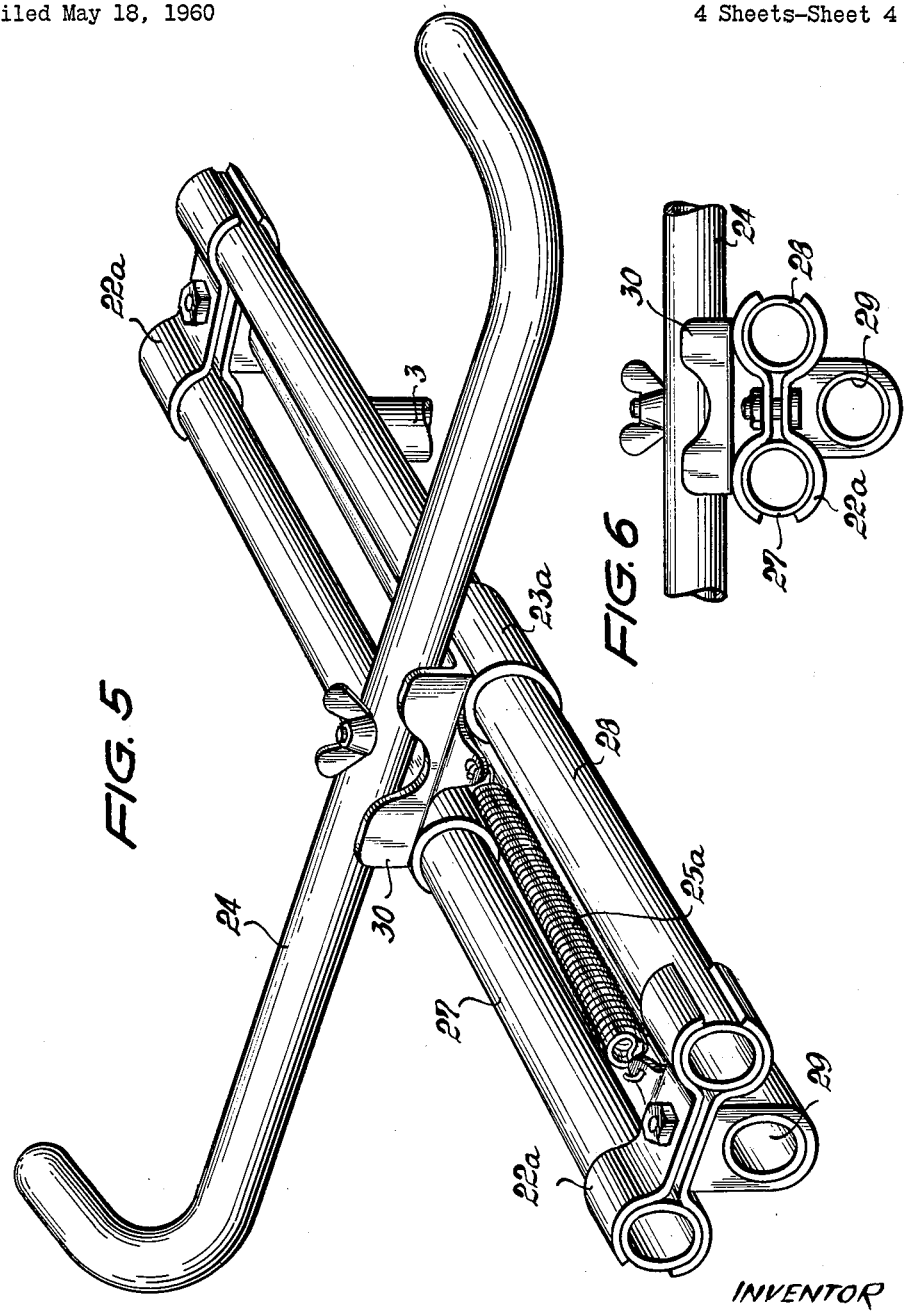

United States Patent Office 3,075,766
Patented Jan. 29, 1963

3,075,766
STATIONARY BODY EXERCISING APPLIANCE
Johann Büscher, 12 Feckelsberger Weg,
Engelskirchen, Germany
Filed May 18, 1960, Ser. No. 29,889
Claims priority, application Germany May 23, 1959
12 Claims. (Cl. 272—73)

The invention relates to stationary physical exercisers.

Devices of this kind are intended to give everyone, even those unable to ride a bicycle, including older people and women, the facility of exercise and the health-giving advantages of cycling.

There are physical exercisers of various kinds. On the bicycle principle there is a tricycle exerciser with which considerable pedalling is necessary, due to the fact that a high ratio of transmission is used to ensure slow progression. Nevertheless, this system requires a suitable running surface, for example a large enclosed yard and this is not always available. The slow rate of travel obtained by means of complicated transmission gearing greatly increases the cost of such a device.

The physical exerciser of the invention, on the other hand, is stationary and can therefore be used in any living room, especially by the open window and hence in the fresh air. It is a pedalling device similar to a ladies' cycle, but without a chain and without handlebars and is, of course stationary. Instead of the front wheel fork a supporting tube is provided which, like the rear-wheel fork, rests on a tubular frame. These tubular frames rest on tubular supports with rubber bases, so that a firm and stable stand is obtained. The tubular frames give the device a height which enables the pedals to be operated with a circular motion despite the absence of wheels. The operation of the pedals drives the pedal crank and a brake disc situated thereon. The brake disc of the pedal crank is subjected to the action of a brake which may comprise a band brake, an internal expanding brake, a side shoe brake, or a shoe brake acting on the periphery of the disc. A Bowden cable leading from this braking device is fastened on the right hand part of the frame and at the top carries a guide screw with a wheel by means of which fine adjustment of the braking effect can be made. By means of this fine adjustment it is possible to obtain during the operation of the pedals a precise braking action on the brake disc and hence any desired resistance as when cycling on the flat or uphill. As a rule, the saddle of the exerciser is larger than that of a bicycle and is anatomically shaped after the style of a motor cycle saddle and is equipped at its rear part with a resilient backrest. This is intended to enable the person using the exerciser to rest quietly on the saddle at any time during exercise without having to dismount or to pause for a while after strenuous exercise.

The invention advantageously provides a further development of a stationary physical exerciser of this kind, by combining such a pedalling device intended for leg movement with another movement mechanism for the additional performance of arm movements and/or movements of the upper body. This gives everyone, even people in town, the opportunity of benefiting from the health-giving effects of cycling involving leg movement with intensive arm and upper body movement. Although it is known to provide means for the compulsory performance of movement of the upper part of the body in training devices for sportsmen, these devices are too complicated and unsuitable for general use. On the other hand, the device according to the invention is a device which can be dismantled and erected in a few minutes and hence, without taking up an excessive amount of room, can be kept in the collapsed state in a box in an apartment.

According to a feature of the invention, the stationary physical exerciser constructed after the style of a bicycle frame is characterized in that its supporting rod is constructed as an additional exerciser for the performance of arm movements and/or upper body movements and for this purpose can slide along a tubular member or the like in the form of a push-rod against the force of a restraining mechanism. The tubular element is advantageously disposed on or in the frame head of the bicycle-like frame and adjustable as to height. In particular, it may comprise an angle tube, in the horizontal tubular arm of which a restraining spring operates and on which a supporting rod in the form of a push-rod can slide and reciprocate. The angular tube may, however, have a horizontal double tubular arm in which two restraining springs operate. In these circumstances, the double tubular arm is advantageously constructed telescopically somewhat in the form of a tubular suspension damper. The restraining springs may act as tension springs or compression springs and be adjustable in respect of their spring force. Alternatively, the restraining mechanism may comprise a pneumatically or hydraulically operating piston arrangement.

A further development of the invention having particular advantages is characterized in that the sliding mechanism for the support rod has a rod unit comprising a plurality of parallel rods. The rods are advantageously of hollow construction so that then the sliding mechanism for the supporting rod has a tube unit comprising a plurality of parallel tubes.

One advantageous embodiment of this further development of the invention is characterized in that the sliding mechanism for the supporting rod has a twin-tube unit. In these circumstances the two parallel tubes of the twin-tube unit may be disposed vertically one above the other. In this case, the upper tube of the twin-tube unit is advantageously held at its ends by the lower tube and constructed as a slide tube on which the supporting rod can slide longitudinally by means of a sleeve or the like. The supporting rod or its sleeve is advantageously equipped with one or more supporting bridge members, which slide along the bottom tube and prevent the supporting rod from tipping sideways. The upper tube may be slotted and in its interior a restraining spring for the supporting rod may be provided. Another advantageous embodiment of the invention is characterized in that the sliding mechanism for the supporting rod is a triple-tube unit. In these circumstances it is advantageous to dispose the three parallel tubes of the triple-tube unit in a triangular arrangement such that two upper parallel adjacent tubes are held at their ends by lower central tube. Advantageously, the two upper tubes are constructed as slide tubes on which the supporting rod can slide longitudinally by means of one or more single sleeves or a twin-sleeve or the like. The restraining spring for the supporting rod is preferably disposed between the upper two slide tubes or between all three tubes. It is advantageous to fasten the restraining spring by one end on a twin or triple sleeve or a tube clip or. the like which, in order to vary the spring action, is slidable and lockable on the tubes of the triple tube unit.

The restraining mechanism is advantageously provided with an indicator to show the person performing the exercises the force applied for the performance of the arm movements and/or upper body movements. When restraining springs are used, the indicating device may be a device after the style of a spring balance equipped with a load scale. In the case of a pneumatic or hydraulic restraining mechanism the indicator may comprise a pressure gauge.

The drawings diagrammatically illustrate a number of exemplified embodiments of the physical exerciser according to the invention which, in comparison with the pure bicycle principle, is also arranged for arm movements and/or upper body movements.

FIGURE 2 is a larger-scale view of the twin-tube unit of FIGURE 1.

FIGURE 3 is an end view of the twin-tube unit of FIGURE 2.

FIGURE 4 shows a physical exerciser, the slide mechanism of which for the supporting rod has a triple-tube unit.

FIGURE 5 is a larger-scale view of the triple-tube unit of FIGURE 4.

FIGURE 6 is an end view of the triple-tube unit of FIGURE 5.

Figure 1:
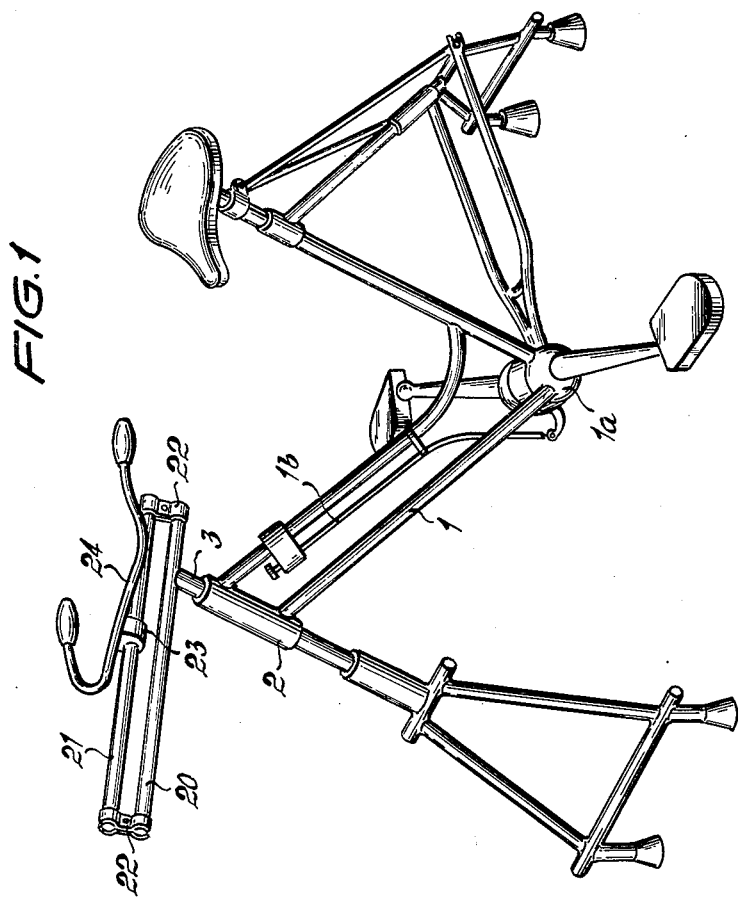
FIGURE 1 shows a physical exerciser, the slide mechanism of which for the supporting rod has a twin-tube unit.

With reference to FIGURES 1 and 4, the physical exerciser is a frame 1 after the style of a bicycle frame and with pedals for the leg movement, the said pedals acting on a braking device 1a, the braking effect of which can be manually varied during pedalling by means of a Bowden cable 1b. The braking device 1a may, for example, comprise an outer shoe brake, an internal expanding brake, a side shoe brake or a band brake. The braking device may also be disposed at another point on the frame 1, for example at the rear or front, and be driven by the pedal crank by means of a driving chain or other suitable transmission.

In the embodiment shown in FIGURES 1 to 3, a tube 3 is shown inserted in the steering head 2 of the frame 1, the said tube being slidable in the upward and downward direction and correspondingly lockable and being joined fast to another tube 20 at the top at an angle of, for example, 90°, pointing in the forward direction. The said tube 20 extends forwardly to a length corresponding to the reach of a long-armed person sitting on the saddle.

In the embodiment shown in FIGURES 1 to 3, the twin-tube unit comprises a lower supporting tube 20 and an upper slide tube 21, which are disposed in parallel relationship to one another and are connected together at their ends by means of the tube clips 22. The upper slide tube 21 is provided with a slot at the top and carries a bush 23 which can be pushed to and fro on the slotted slide tube 21. A push-rod 24 after the style of a bicycle handlebar is disposed transversely on the bush 23. In the bore of the slotted slide tube 21 is disposed a small piston (not shown), on which is fastened a rectangular bolt which fits exactly through the slot in the slide tube 21 and is not visible in the drawing. By means of a longer bolt with a wing nut the push-rod 24 is joined fast to the sleeve 23, the bolt and the piston inside the slotted tube 21. The restraining spring 25 accommodated inside the slotted tube 21 is a tension spring in this case and is fastened by its other end on another small piston, which is mounted at the front end of the slide tube 21 in the bore of the latter. This small piston may be equipped with a small angular bolt, which projects through the slot in the slide tube 21 and is lockable by means of a small piece of thin steel plate with the aid of a wing nut.

If it is desired to perform arm and upper body movements with the device shown in FIGURES 1 to 3, the wing nut with the small piston and hence the tension spring are first locked in the forward position at the top of the slide tube 21. The push-rod 24 with the larger piston mounted thereon is then pushed downwardly against the resistance of the tension spring 25 and by slight relaxation of the pressure can then be returned by means of the tension spring 25, and so on. By displacing the wing nut with the small piston at the top of the slide tube 21 the spring tension can be reduced so that the tension of the restraining spring 25 can be adapted to the strength of weaker people as well. To enable the push-rod 24 to be locked in any desired position according to arm length and thus be usable as a support for the person undergoing training, when only pedalling is carried out, the sleeve 23 also carries a locking wing-screw. This screw extends through the sleeve tube 23 as far as the wall of the slide tube 21 and thus enables the sleeve 23 with the push-tube mounted thereon to be locked as desired on the slotted slide tube 21 by means of a wing-screw. Sliding out in the upward and downward directions is not possible because the two parallel tubes 20 and 21 of the twin-tube unit are connected together by means of a tube clip 22 at the top and bottom. The locating members 26 provided on the sleeve 23 slide along the lower supporting tube 20 during the reciprocating movement of the push-rod 24 and thus prevent the support rod 24 from tipping sideways.

In the embodiment shown in FIGURES 4 to 6, the triple tube unit is formed from three parallel tubes 27, 28 and 29 which extend horizontally and are connected together at their ends in a triangular arrangement. The upper two tubes 27 and 28 are slide tubes, while the lower tube 29 is a supporting tube for the same. The slide tubes 27 and 28 carry a twin sleeve 23a which is slidable thereon and which consists of two short tubular elements which are connected together by an angle iron 30. The push-rod or supporting rod 24, constructed after the style of a handlebar, rests on the angle-iron 30 transversely to the slide tubes 27 and 28. The push-rod 24 is fastened on the angle iron 30 in the centre by means of a wing-screw. The upwardly extending part of the angle iron 30 has a semi-circular recess in the centre so that the supporting rod 24 can be disposed longitudinally when the exerciser is packed. At the ends of the slide tubes 27 and 28 two-part tube clips 22a are provided which can be clamped tight by means of suitable screws. Between the tubes 27, 28, and 29 a restraining spring 25a is provided in the form of a tension spring which is attached at one end to the angle iron 30 and is fastened by its other end to the head-end twin sleeve 22a.

If the push-rod or supporting rod 24 is pulled down against the resistance of the tension spring 25a and is then allowed to return by slight relaxation of the pressure, and so on, a continuous movement of the arm and upper body is automatically obtained. By adjusting the head-end twin sleeve 22a, which consists of the divided tube clips, the restraining spring 25a can be adjusted, so that the tension of the restraining spring 25a can also be adapted to the force exerted by weaker persons.

I claim:

1. A stationary physical exerciser in the form of a stationary frame constructed according to the style of a bicycle frame, with a brake disc, a pedal crank for driving said brake disc, and a braking device operative on said brake disc, characterized in that a support rod adapted for sliding horizontal movement is mounted on the frame head of said stationary bicycle frame and is constructed on said frame as an additional exerciser for the performance of arm movements and upper body movements including a push rod and a slide mechanism therefor, said slide mechanism for said push rod being a rod unit consisting of a plurality of parallel rods which are co-extensive, said push rod being adapted to slide along at least one of said parallel rods against spring force.

2. A stationary physical exerciser according to claim 1, characterized in that said slide mechanism for said push rod is a tubular element consisting of a plurality of parallel tubes, said push rod being slidable along at least one of said parallel tubes against spring force.

3. A stationary physical exerciser according to claim 1, characterized in that the slide means for the support rod is a twin tube unit.

4. A stationary physical exerciser according to claim 3, characterized in that the two parallel tubes of the twin tube unit are disclosed vertically above one another.

5. A stationary physical exerciser according to claim 4, characterized in that the upper tube of the twin tube unit is a slide tube, spacedly supported at its ends from the bottom tube and a sleeve on the upper tube on which the support rod can slide longitudinally.

6. A stationary physical exerciser according to claim 2, characterized in that the slide means for the support rod has a twin tube unit, comprising two vertically superimposed parallel tubes of which the upper tube is a slide tube which is held at its ends by the bottom tube on which the support rod can slide longitudinally by means of a sleeve, and the support rod or its sleeve is equipped with guide members which slide along the bottom tube and prevent the support from tipping sidewise.

7. A stationary physical exerciser according to claim 6, characterized in that the upper slide tube is slotted and in its interior is enclosed a restraining spring for the support rod.

8. A stationary physical exerciser according to claim 1, characterized in that the slide means for the support rod is a triple tube unit.

9. A stationary physical exerciser according to claim 8, characterized in that the three parallel tubes of the triple tube unit are disposed in a triangular arrangement such that two upper parallel adjacent tubes are held at their ends by a lower central tube.

10. A stationary physical exerciser according to claim 9, characterized in that the upper two tubes are two slide tubes on which the support rod can slide longitudinally by means of a sleeve arrangement.

11. A stationary physical exerciser according to claim 1, characterized in that the slide mechanism for the support rod has a triple tube unit, the three parallel tubes of which are disposed in a triangular arrangement such that two upper parallel adjacent tubes are spacedly supported at their ends from a bottom central tube and are two slide tubes on which the support rod can slide longitudinally by means of a sleeve arrangement and a restraining spring for the support rod disposed between the tube.

12. A stationary physical exerciser according to claim 11, characterized in that one end of the restraining spring is fastened and provided with a sleeve arrangement, slidable and lockable for the purpose of varying the spring action.

References Cited in the file of this patent

UNITED STATES PATENTS

| | | |
|---|---|---|
| 1,707,791 | Anderson | Apr. 2, 1929 |
| 2,107,447 | Marlowe | Feb. 8, 1938 |